(12) United States Patent
Duplessis et al.

(10) Patent No.: US 7,505,596 B2
(45) Date of Patent: Mar. 17, 2009

(54) AUTOMATIC DETECTION OF WIRELESS NETWORK TYPE

(75) Inventors: Jean-Pierre Duplessis, Redmond, WA (US); Sean Lyndersay, Seattle, WA (US); Anton Krantz, Kirkland, WA (US); Mohammad S. Alam, Redmond, WA (US); Ashwin Palekar, Sammamish, WA (US); Timothy M. Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 672 days.

(21) Appl. No.: 10/729,209

(22) Filed: Dec. 5, 2003

(65) Prior Publication Data

US 2005/0125693 A1  Jun. 9, 2005

(51) Int. Cl.
*H04K 1/00* (2006.01)
*G06F 7/02* (2006.01)
(52) U.S. Cl. .................... 380/270; 726/4; 726/5
(58) Field of Classification Search ............. 380/270, 380/255, 277; 713/182, 183, 184, 150, 164, 713/168, 169; 709/220–225, 227, 228; 726/4, 726/5
See application file for complete search history.

(56) References Cited

U.S. PATENT DOCUMENTS

| 6,088,451 A * | 7/2000 | He et al. ................... 726/8 |
| 6,629,151 B1 | 9/2003 | Bahl |
| 6,674,738 B1 * | 1/2004 | Yildiz et al. ............ 370/338 |
| 7,099,627 B2 * | 8/2006 | Turner et al. .......... 455/67.11 |
| 2001/0023446 A1 * | 9/2001 | Balogh ................... 709/229 |
| 2002/0176366 A1 * | 11/2002 | Ayyagari et al. ........... 370/245 |
| 2003/0054818 A1 | 3/2003 | Bahl et al. |
| 2003/0097596 A1 * | 5/2003 | Muratov et al. ........ 713/202 |
| 2003/0204748 A1 * | 10/2003 | Chiu ...................... 713/201 |
| 2004/0068653 A1 * | 4/2004 | Fascenda ................ 713/168 |
| 2004/0111520 A1 * | 6/2004 | Krantz et al. ........... 709/229 |
| 2005/0063338 A1 * | 3/2005 | Tsui ........................ 370/331 |

OTHER PUBLICATIONS

Microsoft Corporation, Microsoft Announces Wireless Provisioning Services, Making Wireless Connectivity Easier and More Secure, PressPass Information to Journalists, 2003.
Boingo Wireless, Inc., Hot 5000 Spotsl, 5,000 Reasons to Choose Boingo!, 2001-2003.

(Continued)

*Primary Examiner*—Nasser G Moazzami
*Assistant Examiner*—Fatoumata Traore
(74) *Attorney, Agent, or Firm*—Amin, Turocy & Calvin, LLP

(57) ABSTRACT

A system and method for facilitating automatic detection of a type of wireless network is provided. In accordance with an aspect of the present invention, wireless network client(s) can automatically detect the "type" of a network (e.g., method of authentication and encryption) without requiring input from the user. For example, unencrypted network, WEP encrypted network requiring a WEP key, WPA encrypted network requiring a pre-shared key, an IEEE 802.1x enabled network supporting WPA and/or an IEEE 802.1x enabled network not supporting WPA. In accordance with an aspect of the present invention, a wireless network detection system having a connection component and a detection component is provided. The connection component facilitates connection of a client system to at least one of a plurality of wireless networks. The detection component identifies a type of an available wireless network. Identification can be based, for example, upon information received in an information element and/or iterative probing of the wireless network beacon.

14 Claims, 6 Drawing Sheets

OTHER PUBLICATIONS

Microsoft Corporation, Overview of the WPA Wireless Security Update in Windows XP, Microsoft Knowledge Base Article—815485, 2003.

Jon A. Larosa, WPA: A Key Step Forward in Enterpriser-Class Wireless LAN (WLAN) Security, Meetinghouse Data Communications, Inc., White Paper, May 26, 2003, pp. 1-10.

* cited by examiner

AUTOMATIC DETECTION OF WIRELESS NETWORK TYPE

TECHNICAL FIELD

The present invention relates generally to wireless network communication, and, more particularly, to a system and method facilitating automatic detection of a wireless network type.

BACKGROUND OF THE INVENTION

Computer device(s) performing network communications over wireless links are becoming increasingly popular. Conventionally, when a user comes within range of a wireless network, the client device (e.g., computer system) is able to discern two pieces of information about that network, without connecting to it (e.g., from the wireless network beacon): (1) the service set identifier (SSID) of the network (e.g., essentially its name); and, (2) whether or not the network encrypts data. If the network employs encryption, an encryption key is required. The encryption key can be manually entered by the user and/or sent in accordance with the 802.1x protocol.

With the information that the client device can retrieve from the wireless network beacon, the client device can generally determine whether the network is of type unencrypted, encrypted or, with the addition of a Wi-Fi Protected Access (WPA) information element, encrypted using WPA-pre-shared key or encrypted using WPA. If it is unencrypted, then a user needs only to acknowledge that the network is insecure, and that they wish to use it in spite of that information. However, if it is encrypted and does not use WPA, then it either requires the user to enter a WEP key or it is an 802.1x-enabled network which distributes the WEP key automatically (requiring the client computer to enable 802.1x authentication to complete the connection).

Since the client computer cannot tell whether the non-WPA encrypted network requires the user to enter a WEP key or is an 802.1x-enabled network which does not support WPA, it typically requests input from the user. In the vast majority of cases, the user is in no position, from a technical knowledge perspective, to answer such a request.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method facilitating automatic detection of a type of wireless network. In accordance with an aspect of the present invention, wireless network client(s) can automatically detect the "type" of a network without requiring input from the user. The "type" in this context, refers to the method of authentication and encryption that the network requires (e.g., unencrypted networks requiring no authentication, encrypted networks requiring the user to enter a WEP key, encrypted networks supporting 802.1x authentication, Wi-Fi Protected Access (WPA) networks requiring the user to enter a WPA pre-shared key, 802.1x enabled network which do support WPA, and/or wireless provisioning services supporting networks). Thus, the system employs a technique for efficiently and safely determining which of the network types the user is attempting to connect to, thereby allowing the operating system to present the user with an appropriate user interface. For example, the system can provide a way to distinguish whether (1) a manually-entered WEP key or (2) 802.1x authentication is required by the wireless network.

In accordance with another aspect of the present invention, a wireless network detection system having a connection component and a detection component is provided. The connection component facilitates connection of a client system to at least one of a plurality of wireless networks. The detection component identifies a type of an available wireless network.

In one example, identification by the detection component can be based, at least in part, upon receipt of a specific information element from a wireless network beacon. In another example, the detection component iteratively probes the wireless network beacon in connection with identifying a type of the wireless network.

For example, the detection component can first attempt to connect to the wireless network as if it were a wireless provisioning services (WPS) supporting network. By waiting for certain kinds of failure(s) in the authentication sequence, the detection component can determine if the network requires the user to enter a WEP key.

If the failures are not observed, the detection component can wait a longer period of time (e.g., up to thirty seconds) for a particular piece of the authentication sequence (e.g., Protected extensible authentication protocol—type length value (PEAP-TLV)) that identifies a WPS network. In the absence of this piece of the sequence, the detection component can identify the wireless network as an 802.1x-enabled network to the connection component. If the particular piece of the authentication sequence is detected by the detection component, then the detection component can identify the network as a WPS supporting network to the connection component.

Accordingly, the user is not asked to determine the network type. This can lead, for example, to user(s) who are more successful in their use of wireless networks and further reduce user frustration with wireless network(s).

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
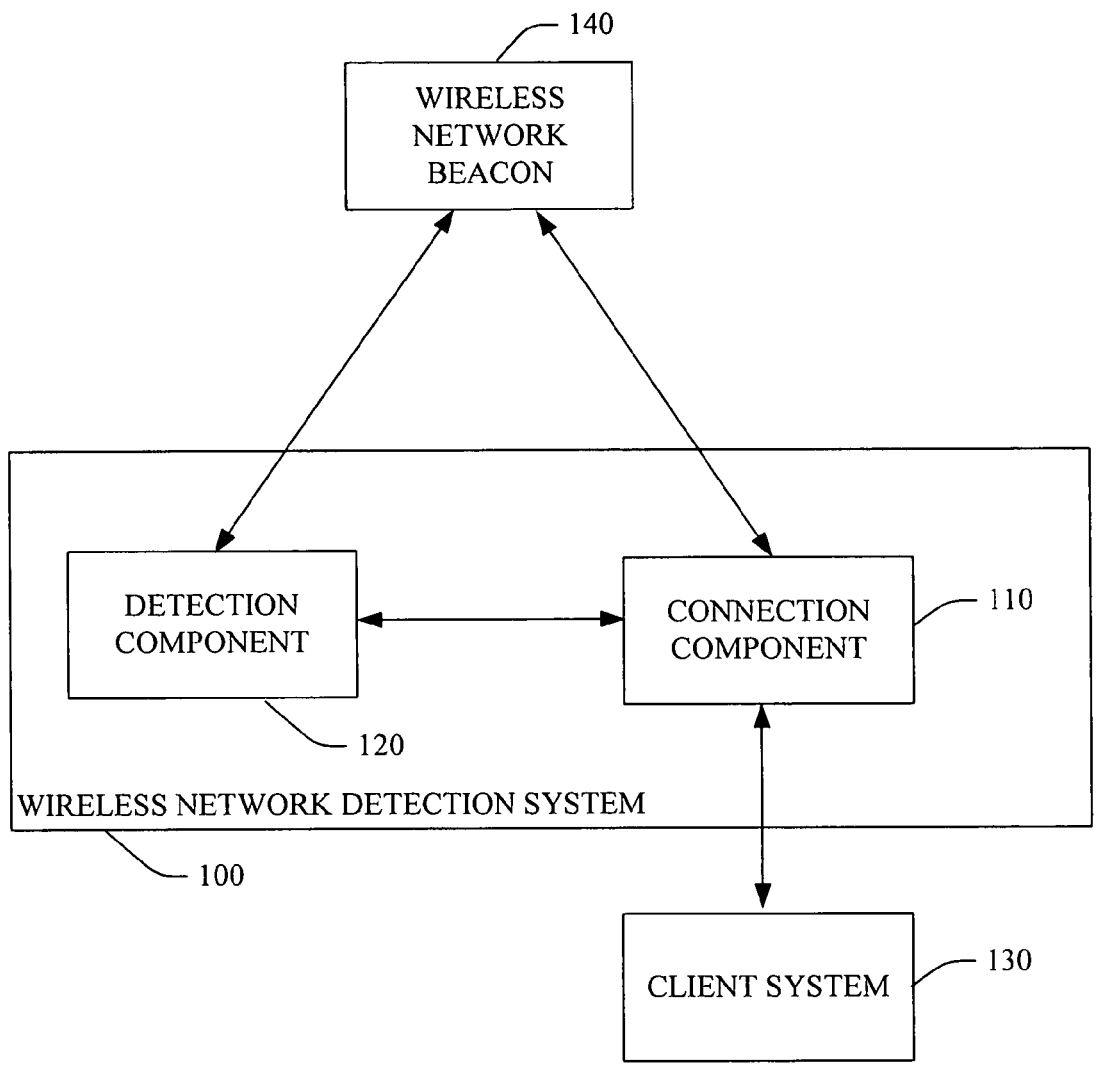
FIG. 1 is a block diagram of a wireless network detection system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Referring to FIG. 1, a wireless network detection system 100 in accordance with an aspect of the present invention is illustrated. The system 100 can facilitate automatic detection of a type of wireless network by a client (e.g., without requiring input from a user). "Type" of wireless network refers generally to the kind of authentication and encryption that the network requires. In one example, wireless networks can be divided into six types:

(1) Unencrypted (e.g., open) networks which generally require no authentication.
(2) Wired equivalent privacy (WEP) encrypted networks where the user needs to enter a WEP key
(3) Wi-Fi Protected Access (WPA) encrypted network where the user needs to enter a WPA pre-shared key (WPAPSK)
(4) 802.1x-enabled networks that do not support WPA.
(5) 802.1x-enabled networks that do support WPA
(6) Wireless provisioning services (WPS) supporting-enabled networks that do or do not support WPA The IEEE 802.11 set of standards defines two network types: encrypted networks (e.g., WEP networks) and unencrypted networks. Owing to the well-known weaknesses of the WEP protocol, the wireless industry implemented support for the IEEE 802.1x standard as a mechanism for addressing the key deficiencies in the WEP protocol, those being user authentication, encryption key management and encryption key distribution. For WEP-encrypted networks, the user needs to provide an encryption key and for 802.1x enabled networks the key is provided automatically if the user has a valid credential (e.g., such as a digital certificate or username and password). For 802.11 networks which are encrypted, this presents a usability problem as it is currently not possible to determine a priori whether the user needs to enter the WEP key or whether the network supports 802.1x, in which case they do not have to enter it.

To address the underlying weaknesses of the WEP algorithm, which has been shown to be cryptographically weak, a security enhancement to the 802.11 set of standards was introduced, called Wi-Fi Protected Access (WPA). WPA also addresses some of the usability issues of the original 802.11 standard by specifying an information element which WPA-capable access points include in their beacon frame. This information element describes inter alia whether the network requires the user to enter the encryption key called WPA pre-shared key mode (WPA-PSK) or whether the key is provided automatically by virtue of the user's credential, referred to as "WPA mode".

Wired Equivalent Privacy

WEP is defined by the IEEE 802.11 standard and is intended to provide a level of data confidentiality that is equivalent to a wired network. Due to the nature of wireless LAN networks, implementing a security infrastructure that monitors physical access to the network can be difficult. Unlike a wired network where a physical connection is required, anyone within range of a wireless access point (AP) can conceivably send and receive frames as well as listen for other frames being sent. This makes eavesdropping and remote sniffing of wireless LAN frames very easy.

WEP provides data confidentiality services by encrypting the data sent between wireless nodes. WEP encryption for an 802.11 frame is indicated by setting a WEP flag in the MAC header of the 802.11 frame. WEP provides data integrity for random errors by including an integrity check value (ICV) in the encrypted portion of the wireless frame.

The following tables illustrates the two shared keys that WEP defines:

TABLE 1

| Key type | Description |
| --- | --- |
| Multicast/global key | Encryption key that helps to protect multicast and broadcast traffic from a wireless AP to all of its connected wireless clients. |
| Unicast session key | Encryption key that helps to protect unicast traffic between a wireless client and a wireless AP and multicast and broadcast traffic sent by a wireless client to the wireless AP. |

WEP encryption employs the RC4 symmetric stream cipher with 40-bit and 104-bit encryption keys.

Wi-Fi Protected Access

WPA is a Wi-Fi standard designed to improved upon the security features of WEP. Unlike WEP, 802.1x authentication is required in WPA. With WPA, rekeying of both unicast and global encryption keys is required. For the unicast encryption key, the Temporal Key Integrity Protocol (TKIP) changes the key for every frame, and the change is synchronized between the wireless client and the wireless access point (AP). For the global encryption key, WPA includes a facility for the wireless AP to advertise the changed key to the connected wireless clients.

TKIP replaces WEP with an encryption algorithm that is stronger than the WEP algorithm. TKIP also provides for verification of the security configuration after the encryption keys are determined; synchronized changing of the unicast encryption key for each frame; and, determination of a unique starting unicast encryption key for each pre-shared key authentication.

WPA further employs a method known as "Michael" that specifies an algorithm that calculates an 8-byte message integrity code (MIC). The MIC is placed between the data portion of the IEEE 802.11 frame and the 4-byte integrity check value (ICV). The MIC field is encrypted together with the frame data and the ICV.

WPA is an interim standard that will be replaced with the IEEE's 802.11i standard upon its completion.

Wireless Provisioning Services (WPS) Supporting Networks

WPS allows Wi-Fi network providers and/or enterprises to send provisioning and configuration information to a mobile client as it connects to the Internet or a corporate network, providing seamless and automatic provisioning and configuration of the client with uniform sign-up experience. As a user logs onto a wireless network, the network recognizes the user, automatically sets up the session, and bills the user's account.

The security of a wireless session is improved because the automatic authentication and encryption provided by WPS minimizes the chances that a user's wireless session will be broken into by rogue access points or hackers. With WPS, a network can request substantially any type of information from the user, for example, a user name, a coupon code, and/or demographic information.

Distinctions Between Exemplary Wireless Network Types

Figure 2:
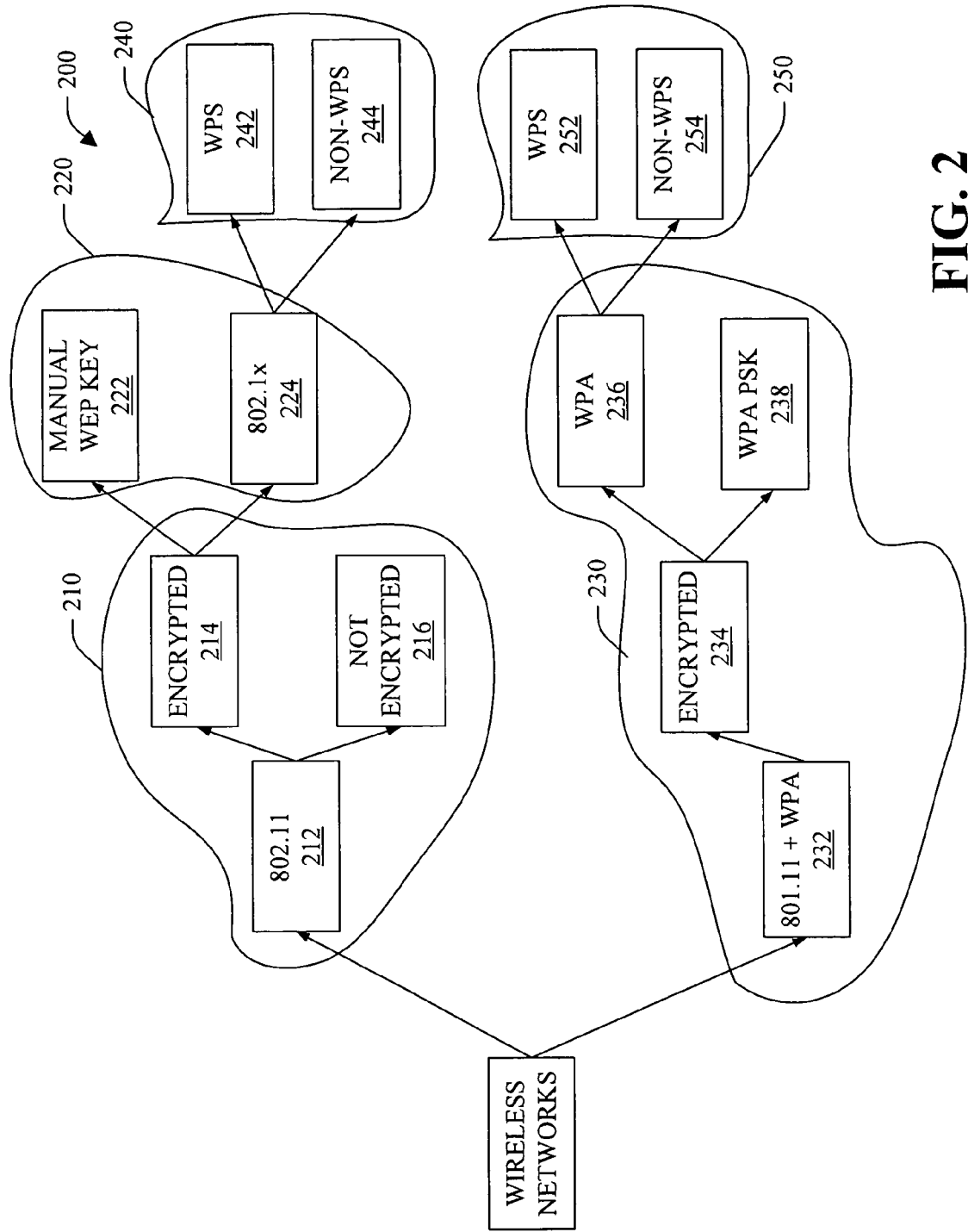
FIG. 2 is a block diagram of exemplary wireless network types in accordance with an aspect of the present invention.

Turning briefly to FIG. 2, a diagram 200 exemplary wireless network types in accordance with an aspect of the present invention is illustrated.

Wireless networks encompassed by the original 802.11 specification 210 include encrypted 214 and not encrypted 216. The 802.1x specification further facilitated automatic distribution of the WEP encryption key 222 and 802.1x authentication 224. The introduction of WPS further provides for 802.1x authentication 224 to be sub-divided into network(s) that support WPS 242 and network(s) that do not support WPS 244.

Alternatively, introduction of the WPA specification provided for wireless network supporting the 802.11 specification and further encompassing the WPA specification 230. These network(s) are encrypted 234 and can be sub-divided into WPA 236 (e.g., 802.1x-enabled networks that support WPA) and WPA PSK 238. With the introduction of WPS, the WPA node 236 can be further sub-divided into network(s) that support WPS 252 and network(s) that do not support WPS 254.

The Wireless Network Detection System 100

Returning to FIG. 1, the wireless network detection system 100 includes a connection component 110 and a detection component 120. The connection component 110 facilitates connection of a client system 130 to at least one of a plurality of type of wireless networks. The detection component 120 can iteratively probe an available wireless network beacon 140 in connection with identifying a type of the wireless network. For example, the system 100 can employ a probing technique to determine the network type of a "new" network the first time the user tries to connect to it. Additionally and/or alternatively, the system 100 can employ an information element from the wireless network beacon 140 to facilitate determination of the network type.

As discussed previously, conventionally, when a user comes within range of a wireless network, the client computer is able to discern two pieces of information about that network, without connecting to it (e.g., from the wireless network beacon): (1) the SSID of the network (e.g., essentially its name); and, (2) whether or not the network encrypts data. If the network employs encryption, an encryption key is required. The encryption key can be manually entered by the user and/or via the 801.1x protocol. Thus, for each of the network types, the information the client computer requires from the user can be different.

However, with the information that the computer can retrieve from the network beacon, the computer can only determine whether the network is (a) unencrypted (type #1) or (b) encrypted (type #2 or #4) or, with the addition of the WPA information element, encrypted using WPA-PSK (type #3) or encrypted using WPA (type #5)

If it is unencrypted (e.g., type #1), then the user can acknowledge that the network is insecure, and that they wish to use it in spite of that information. However, if it is encrypted and does not use WPA, then it is either of type #2 or #4. If it is type #2, the user would need to enter a WEP key, and if it is type #4, the user does not need to enter a WEP key, but the client computer needs to enable 802.1x authentication to complete the connection. Since the client computer cannot tell whether the network is #2 or #4, it essentially has to ask the user. In the vast majority of cases, the user is in no position (from a technical knowledge perspective) to answer such a question. The introduction of WPS network(s) has made the situation even more complicated (e.g., three different types of encrypted networks).

The wireless network detection system 100 efficiently and safely determines which of a plurality of network types the user is attempting to connect to, in order to present the user with appropriate user interface (UI). As noted previously, for each of the network types, the information the client computer needs from the user can be different. Thus, the system 100 can provide a way to distinguish whether (1) a manually-entered WEP key or (2) 802.1x authentication is required by the wireless network without significant user input.

In one example, the system 100 employs an information element (IE) from the wireless network beacon 140 to facilitate determination of the network type. The general concept of an IE is part of the 802.11 standard. In accordance with an aspect of the present invention, a specific IE, for example, two bits, can be used to provide information to distinguish between the types of network (e.g., three). The following table illustrated the structure and layout of an exemplary IE:

TABLE 2

| Name | Value | Size (octets) | Description |
| --- | --- | --- | --- |
| Element ID | 0xDD | 1 | |
| Length | 11 | 1 | |
| OUI | 0x00:50:f2 | 3 | |
| OUI Type | 5 | 1 | |
| WPS supported | True/False | 1 | Indicates whether the network supports wireless provisioning services |
| 802.1X required | True/False | 1 | For WEP (not WPA) networks, indicates whether 802.1X is required |

In this example, the wireless network beacon 140 provides the IE to the detection component 120. Based, at least in part, upon the IE, the detection component 120 identifies the type of wireless network.

In another example, the system 100 employs a probing technique to determine the encryption type of a network, for example, performed the first time the user tries to connect to it. For example, the detection component 120 can first attempt to connect to the wireless network as if it were a WPS network. WPS networks are a subset of 802.1x networks (e.g., type #4 or type #5) and may or may not support WPA. By waiting for certain kinds of failure(s) in the authentication sequence, the detection component 120 can determine if the network is of type #2 (e.g., manually entered WEP key). For example, the probing can mitigate impact upon the user by recognizing a common type of network (e.g., manually entered WEP key).

If the failures are not observed, the detection component 120 can wait a longer period of time (e.g., up to thirty seconds) for a particular piece of the authentication sequence (e.g., Protected extensible authentication protocol—type length value (PEAP-TLV)) that identifies a WPS network. In the absence of this piece of the sequence, the detection component 120 can identify the wireless network as type #4 or type #5 to the connection component 110. If the particular piece of the authentication sequence is detected by the detection component 120, then the detection component 120 can identify the network as a WPS supporting network to the connection component 110.

Accordingly, the user is not asked to determine the network type. This can lead, for example, to user(s) who are more successful in their use of wireless networks and further reduce user frustration with wireless network(s).

It is to be appreciated that the wireless network detection system 100, the connection component 110, the detection component 120, the client system 130 and/or the wireless network beacon 140 can be computer components as that term is defined herein.

Figure 3:
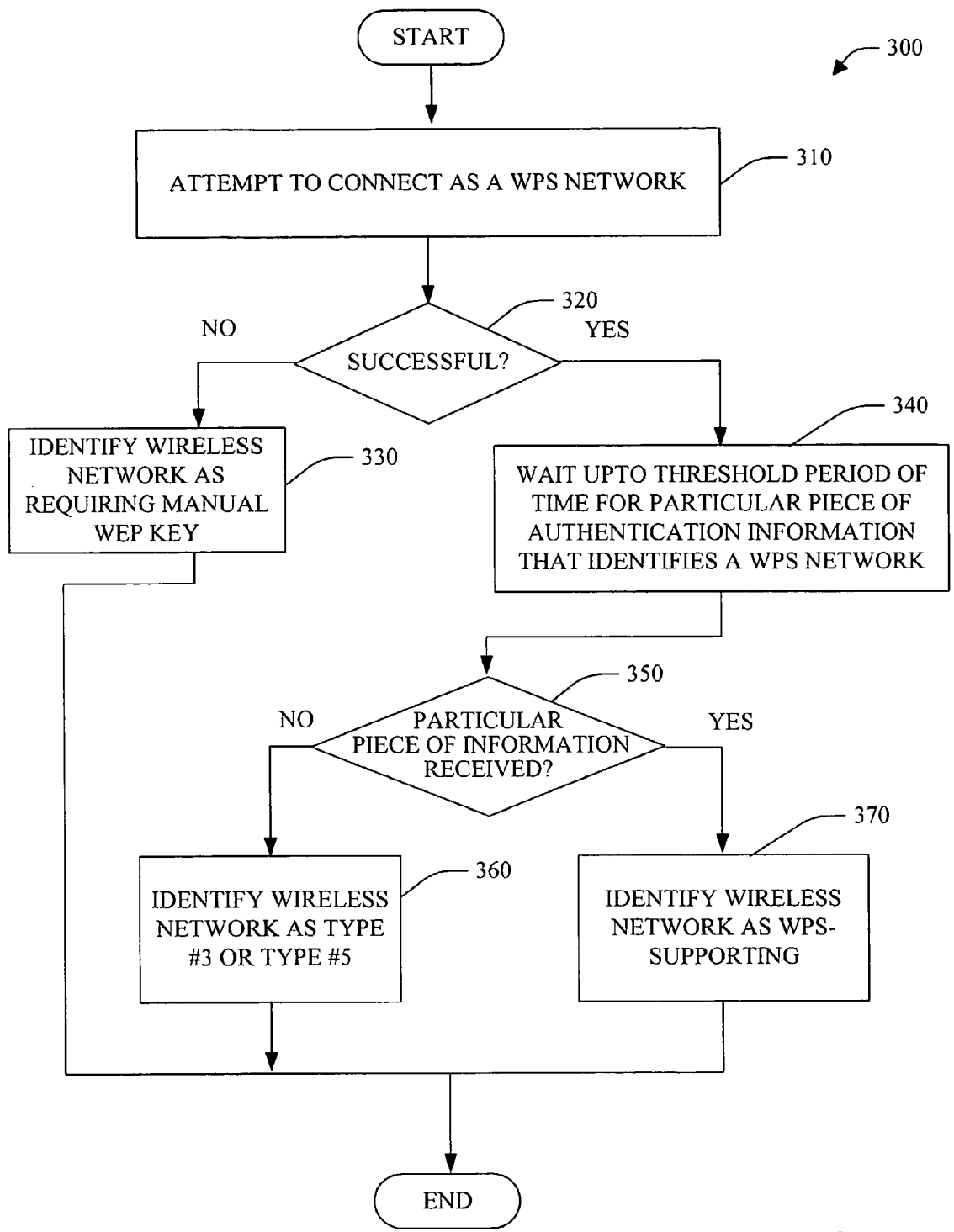
FIG. 3 is a flow chart of a method facilitating wireless network detection in accordance with an aspect of the present invention.
Figure 4:
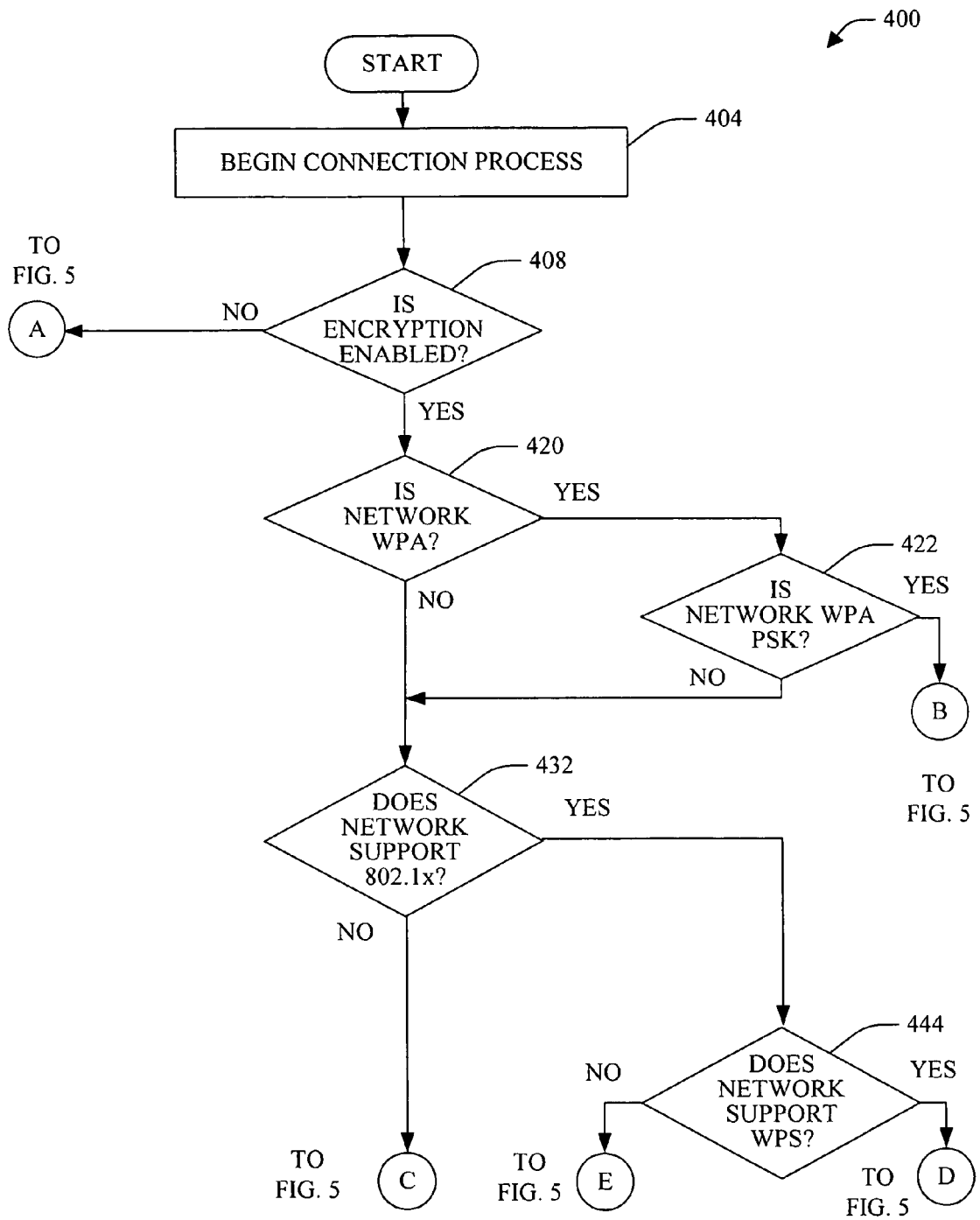
FIG. 4 is a flow chart of a method facilitating wireless network detection in accordance with an aspect of the present invention.
Figure 5:
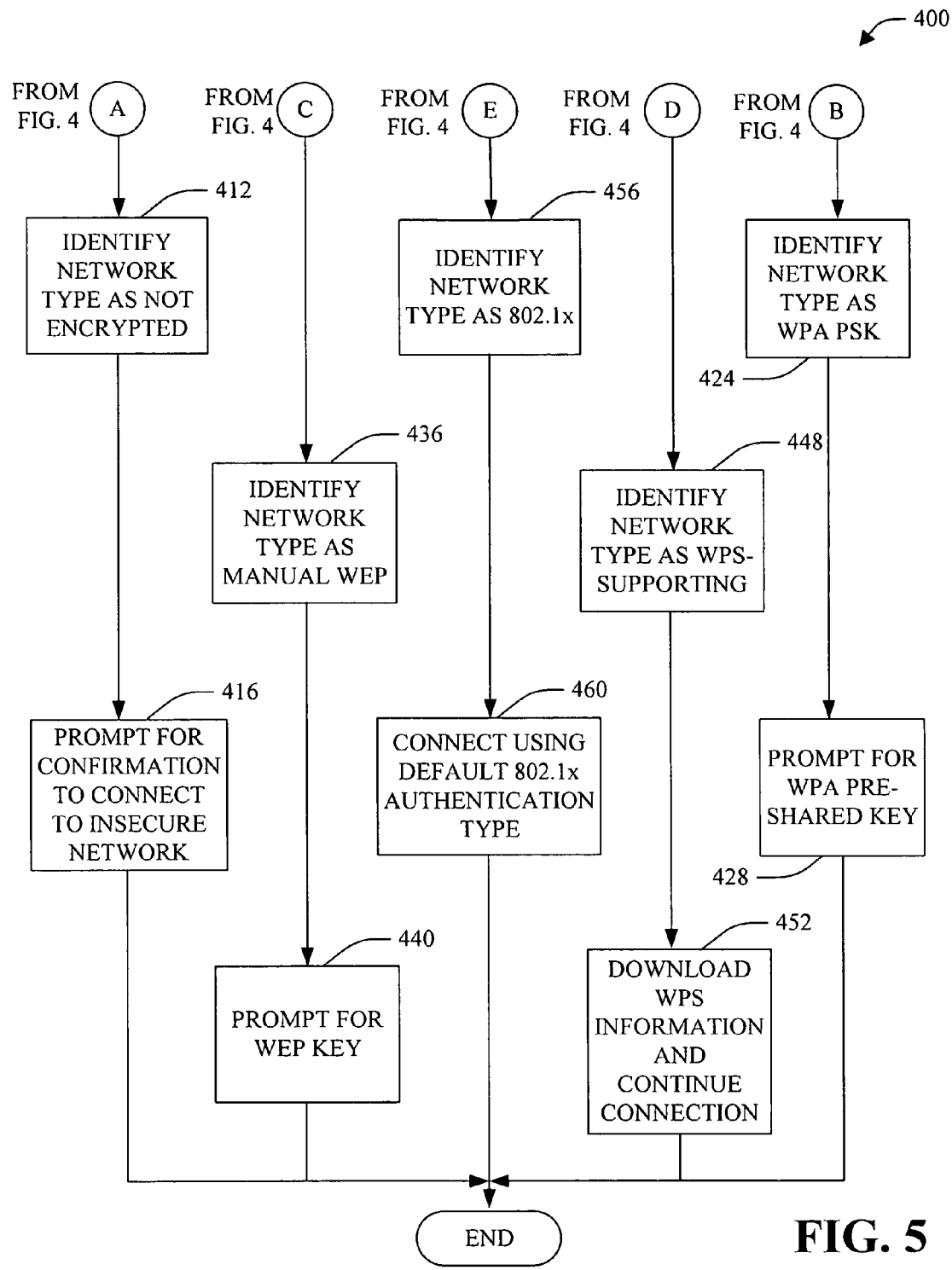
FIG. 5 is a flow chart further illustrating the method of FIG. 4.

Turning briefly to FIGS. 3-5, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 3, a method facilitating wireless network detection 300 in accordance with an aspect of the present invention is illustrated. At 310, connection to a wireless network as a WPS network is attempted. At 320, a determination is made as to whether the attempt was successful. If the determination at 320 is NO, at 330, the wireless network is identified as required a WEP key, and, no further processing occurs.

If the determination at 320 is YES, at 340, up to a threshold period of time (e.g., 30 seconds) is waited for a receipt of a particular piece of authentication information that identifies a WPS network (e.g., PEAP—TLV sequence). At 350, a determination is made as to whether the particular piece of authentication information has been received. If the determination at 350 is NO, at 360, the network is identified as type #4 or type #5, and, no further processing occurs. If the determination at 350 is YES, at 370, the network is identified as WPS-supporting, and, no further processing occurs.

Next, referring to FIGS. 4 and 5, a method facilitating wireless network detection 400 in accordance with an aspect of the present invention is illustrated. At 404, the connection process is begun. At 408, a determination is made as to whether the wireless network is encrypted (e.g., based, at least in part, upon information received from the wireless network beacon). If the determination at 408 is NO, at 412, the network is identified as not encrypted. At 416, a user can be prompted for confirmation to connect to an insecure network, and, no further processing occurs.

If the determination at 408 is YES, at 420, a determination is made as to whether the network is WPA (e.g., based, at least, in part, upon information received from the wireless network beacon). If the determination at 420 is YES, at 422, at determination is made as to whether the network is WPA PSK (e.g., based, at least in part, upon information received from the wireless network beacon). If the determination at 422 is YES, at 424, the network is identified as WPA PSK. At 428, a user can be prompted to enter a WPA pre-shared key, and, no further processing occurs. If the determination at 422 is NO, processing continues at 432.

If the determination at 420 is NO, at 432, a determination is made as to whether the network supports 802.1x. For example, as discussed previously, the determination can be made by employing a probing technique and/or an information element received from the wireless network beacon. If the determination at 432 is NO, at 436, the network is identified as a manual WEP type. At 440, a user can be prompted to enter a WEP key, and, no further processing occurs.

If the determination at 432 is YES, at 444, a determination is made as to whether the network supports WPS. Again, the determination can be made by employing a probing technique and/or an information element received from the wireless network beacon. If the determination at 444 is YES, at 448, the network is identified as WPS-supporting. At 452, WPS information can be loaded and the connection continued, and, no further processing occurs.

If the determination at 444 is NO, at 456, the network is identified as an 802.1x network. At 460, connection to the wireless network can be continued using a default 802.1x authentication type, and, no further processing occurs.

Figure 6:
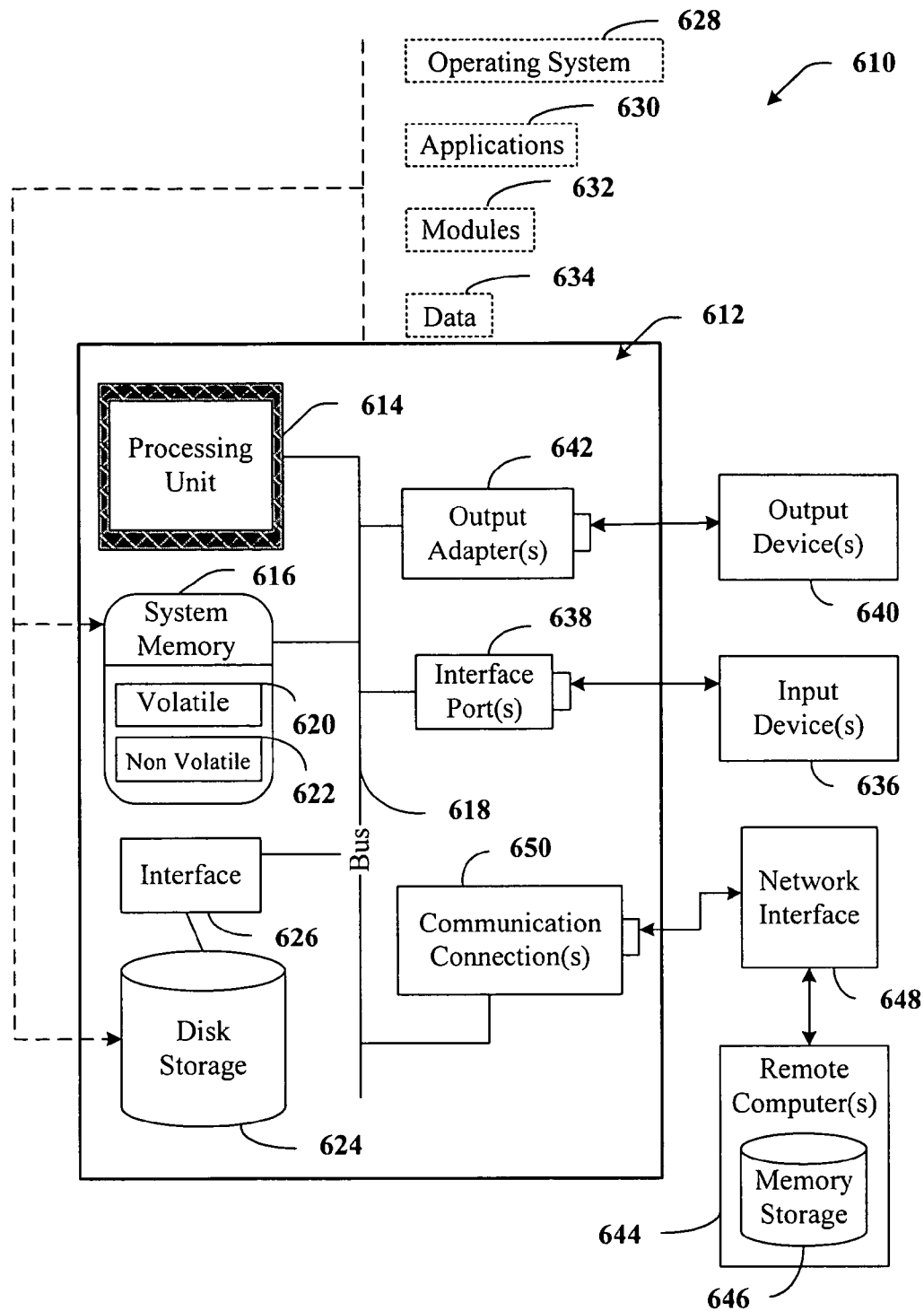
FIG. 6 illustrates an example operating environment in which the present invention may function.

In order to provide additional context for various aspects of the present invention, FIG. 6 and the following discussion are intended to provide a brief, general description of a suitable operating environment 610 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 610 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 6, an exemplary environment 610 for implementing various aspects of the invention includes a computer 612. The computer 612 includes a processing unit 614, a system memory 616, and a system bus 618. The system bus 618 couples system components including, but not limited to, the system memory 616 to the processing unit 614. The processing unit 614 can be any of various available processors. Dual microprocessors and other multiprocessor architectures also can be employed as the processing unit 614.

The system bus 618 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 616 includes volatile memory 620 and nonvolatile memory 622. The basic input/output system (BIOS), containing the basic routines to transfer information between elements within the computer 612, such as during start-up, is stored in nonvolatile memory 622. By way of illustration, and not limitation, nonvolatile memory 622 can include read only memory (ROM), programmable ROM (PROM), electrically programmable ROM (EPROM), electrically erasable ROM (EEPROM), or flash memory. Volatile memory 620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 612 also includes removable/nonremovable, volatile/nonvolatile computer storage media. FIG. 6 illustrates, for example a disk storage 624. Disk storage 624 includes, but is not limited to, devices like a magnetic disk drive, floppy disk drive, tape drive, Jaz drive, Zip drive, LS-100 drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to the system bus 618, a removable or non-removable interface is typically used such as interface 626.

It is to be appreciated that FIG. 6 describes software that acts as an intermediary between users and the basic computer resources described in suitable operating environment 610. Such software includes an operating system 628. Operating system 628, which can be stored on disk storage 624, acts to control and allocate resources of the computer system 612. System applications 630 take advantage of the management of resources by operating system 628 through program modules 632 and program data 634 stored either in system memory 616 or on disk storage 624. It is to be appreciated that the present invention can be implemented with various operating systems or combinations of operating systems.

A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port may be used to provide input to computer 612, and to output information from computer 612 to an output device 640. Output adapter 642 is provided to illustrate that there are some output devices 640 like monitors, speakers, and printers among other output devices 640 that require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a personal computer, a server, a router, a network PC, a workstation, a microprocessor based appliance, a peer device or other common network node and the like, and typically includes many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 650 refers to the hardware/software employed to connect the network interface 648 to the bus 618. While communication connection 650 is shown for illustrative clarity inside computer 612, it can also be external to computer 612. The hardware/software necessary for connection to the network interface 648 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A wireless network detection system including computer storage medium storing a computer executable instructions that when executed on one or more processors facilitates identification of wireless network encryption type, said system comprising:
    a connection component that can connect a device to a plurality of wireless networks; and,
    a detection component that automatically identifies an encryption type of an available wireless network, wherein identification of the encryption type is based at least in part upon eliminating one or more of a plurality of possible encryption types by at least one of detecting a failure of a portion of an authentication sequence of the available wireless network or exceeding a time threshold without having detected an expected portion of the authentication sequence of the available wireless network, wherein identifying the encryption type includes:
        the detection component attempting an 802.1x authentication sequence to the wireless network and determining that the wireless network as a wired equivalent privacy network requiring a wired equivalent privacy key when a failure of a portion of the 802.1x authentication sequence or exceeding a time threshold without having detected an expected portion of the 802.1x authentication sequence occurs;
        the detection component identifying the wireless network as a 802.1x when a failure of a portion of the 802.1x authentication sequence and exceeding a time threshold without having detected an expected portion of the 802.1x authentication sequence do not occur;
        the detection component having identified the wireless network as a 802.1x attempting a wireless provisioning services sequence and determining that the wireless network does not support wireless provisioning services when a failure of a portion of the wireless provisioning services authentication sequence or exceeding a time threshold without having detected an expected portion of the wireless provisioning services authentication sequence occurs; and,
        the detection component identifying the wireless network as a 802.1x supporting wireless provisioning services network when a failure of a portion of the wireless provisioning services authentication sequence and exceeding a time threshold without having detected an expected portion of the wireless provisioning services authentication sequence do not occur.

2. The system of claim 1, identification of the encryption type of the available wireless network by the detection component being based, at least in part, upon receipt of an information element from a wireless network beacon.

3. The system of claim 1, the available wireless network comprising at least one of an unencrypted network, a Wired Equivalent Privacy (WEP) network requiring a WEP key, a Wi-Fi Protected Access (WPA) encrypted network requiring a WPA pre-shared key, an 802.1x-enabled network that does not support WPA, an 802.1x-enabled network that does support WPA and a wireless provisioning services (WPS) support-enabled network.

4. The system of claim 1, identification of the encryption type of the available wireless network by the detection component being based, at least in part, upon iterative probing of the available network.

5. The system of claim 4, wherein the detection component attempts to connect to the available wireless network as a wireless provisioning services-supporting network, the detection component determining that the available wireless network is a pre-shared key network if a failure in an authentication sequence from a wireless network beacon is determined.

6. The system of claim 5, the detection component determining that the available wireless network is a Wi-Fi Protected Access network if a failure in a particular piece of the authentication sequence that identifies a wireless provisioning services supporting network is determined.

7. The system of claim 6, the particular piece of the authentication sequence comprising a type, length value sequence.

8. The system of claim 6, the detection component determining that the available wireless network is a wireless provisioning services supporting network if the particular piece of authentication sequence identifying the wireless provisioning services supporting network is received from the wireless network beacon.

9. The system of claim 1, wherein the detection component sends at least one of a connect message, an 802.1x Extensible Authentication Protocol Over Lan (EAPOL) start message, an 802.1x identity message.

10. The system of claim 1, wherein the detection component receives at least one of an associated message, an 802.1x identity request message, an authentication message and a provisioning message from a wireless network beacon.

11. A method facilitating wireless network detection comprising:
    determining whether a wireless network supports 802.1x by attempting an 802.1x authentication sequence to the wireless network;
    identifying the wireless network as a wired equivalent privacy network requiring a wired equivalent privacy key when a failure of a portion of the 802.1x authentication sequence or exceeding a time threshold without having detected an expected portion of the 802.1x authentication sequence occurs;
    identifying the wireless network as a 802.1x when a failure of a portion of the 802.1x authentication sequence and exceeding a time threshold without having detected an expected portion of the 802.1x authentication sequence do not occur;
        having identified the wireless network as a 802.1x attempting a wireless provisioning services sequence;
        identifying the wireless network as a 802.1x that does not support wireless provisioning services when a failure of a portion of the wireless provisioning services authentication sequence or exceeding a time threshold without having detected an expected portion of the wireless provisioning services authentication sequence occurs; and,
        identifying the wireless network as a 802.1x supporting wireless provisioning services network when a failure of a portion of the wireless provisioning services authentication sequence and exceeding a time threshold without having detected an expected portion of the wireless provisioning services authentication sequence do not occur.

12. The method of claim 11, further comprising at least one of the following acts:
    determining whether the wireless network is encryption enabled; upon determining that the wireless network is encrypted, determining if the wireless network is a Wi-Fi Protected Access (WPA) network; and, upon determining that the wireless network is a Wi-Fi Protected Access (WPA) network, identifying the network as a WPA network and determining whether the WPA wireless network is a Wi-Fi Protected Access (WPA) pre-shared key network.

13. The method of claim 12, further comprising at least one of the following acts:
identifying the wireless network as unencrypted, upon determining the wireless network is not encryption enabled; and,
identifying the wireless network as a Wi-Fi Protected Access pre-shared key network, upon determining the WPA wireless network is a Wi-Fi Protected Access (WPA) pre-shared key network.

14. A wireless network detection system including computer storage medium storing a computer executable instructions that when executed on one or more processors facilitates identification of wireless network encryption type, said system comprising:
means for connecting a device to a plurality of wireless networks; and,
means for automatically identifying an encryption type of an available wireless network, wherein identification of the encryption type is based at least in part upon eliminating one or more of a plurality of possible encryption types by at least one of detecting at least one of failure of a portion of an authentication sequence or exceeding a time threshold without having detected a particular portion of the authentication sequence, wherein identifying the encryption type includes:
means for automatically identifying an encryption type attempting an 802.1x authentication sequence to the wireless network and determining that the wireless network as a wired equivalent privacy network requiring a wired equivalent privacy key when a failure of a portion of the 802.1x authentication sequence or exceeding a time threshold without having detected an expected portion of the 802.1x authentication sequence occurs;
means for automatically identifying an encryption type identifying the wireless network as a 802.1x when a failure of a portion of the 802.1x authentication sequence and exceeding a time threshold without having detected an expected portion of the 802.1x authentication sequence do not occur;
means for automatically identifying an encryption type having identified the wireless network as a 802.1x attempting a wireless provisioning services sequence and determining that the wireless network does not support wireless provisioning services when a failure of a portion of the wireless provisioning services authentication sequence or exceeding a time threshold without having detected an expected portion of the wireless provisioning services authentication sequence occurs; and,
means for automatically identifying an encryption type identifying the wireless network as a 802.1x supporting wireless provisioning services network when a failure of a portion of the wireless provisioning services authentication sequence and exceeding a time threshold without having detected an expected portion of the wireless provisioning services authentication sequence do not occur.

* * * * *